Dec. 22, 1970  S. L. CASALINA  3,549,509
SOLID OBJECTS CONTAINING LIGNOCELLULOSE PARTICLES AND
RADIATION-INDUCED POLYMER AND METHOD OF MAKING SAME
Filed June 1, 1967

INVENTOR.
Samuel L. Casalina
BY Warren, Milmore,
Cypher, Rubin & Brucker
Attorneys

United States Patent Office 3,549,509
Patented Dec. 22, 1970

3,549,509
SOLID OBJECTS CONTAINING LIGNOCELLULOSE PARTICLES AND RADIATION-INDUCED POLYMER AND METHOD OF MAKING SAME
Samuel L. Casalina, Watsonville, Calif., assignor to Di Giorgio Corporation, a corporation of Delaware
Filed June 1, 1967, Ser. No. 642,768
Int. Cl. B01j 1/10; C08b 15/00
U.S. Cl. 204—159.12
7 Claims

ABSTRACT OF THE DISCLOSURE

Forestry particles, such as sawdust, wood and bark chips, are impregnated with a liquid of a monomer having a radiation-activatable reactive group, optionally with a catalyst or promoter, molded under pressure to place the particles into touching relation and form an article, which may be a sheath about a pre-existing object, and subjected to high-intensity ionizing radiation to polymerize the monomer and bind the particles into a solid object of stable shape.

---

The invention relates to the formation of a solid, organic composite article from discrete forestry particles, such as sawdust and chips from wood, bark and nut shells, such as whole, crushed or communited walnut shells. The invention is especially, although not exclusively, applicable to the utilization of sawdust and chips from sawmills, and the composite article is given any desired shape by molding, either into an independent object or into a coating or sheath which adjoins a pre-existing object.

In countries with forestry resources, logging and sawmill by-products, such as bark, chips and sawdust, represent waste material consisting principally of lignocellulose. They are now utilized largely for particle-board manufacture, pressure sawdust fireplace logs, nursery applications, such as mulches, and for burning. They are not an efficient fuel and the air pollution resulting from burning has sharply reduced this use. There is need to find and develop a use for this waste by-product from the lumber industry to maintain a clean environment and to utilize the abundant supplies of such material.

Prior attempts to utilize such waste material in the formation of solid objects had important drawbacks. When these particles were used as a filler in a hardened matrix material, the resultant objects were essentially blocks of the matrix material with dispersed particles, whereby the latter did not contribute effectively to the bulk and/or strength of the objects; also, this required an unduly large proportion of such matrix material to be used. It is, however, desirable to form such objects to as high a degree as possible of the lignocellulosic particles. Polymerization of a thermosetting resin with which the particles were impregnated was not feasible due to the need to heat the mixture to polymerizing temperature, which led to a weakening of the particle strength and, often, to charring. The use of catalysts to hasten polymerization was not feasible because it required close control of the operation. Also, it was not always possible to strip the polymerized object from the mold.

The invention is illustrated by the accompanying drawing wherein.

Now according to the invention, such particles of tree parts are bonded together to form an article of desired shape and containing said particles in contact with each other, by impregnating particles with a liquid monomer having a radiation-activatable reactive group, molding the particles within a mold under pressure to the desired shape (the impregnation occurring either before or after pressure-molding), and effecting polymerization of the monomer by subjecting the molded and impregnated mass to high-intensity ionizing radiation. The irradiation can be effected at ambient or moderately elevated temperature and ambient or elevated pressure, and the radiation dosage will vary with such factors as the radiation energy, the specific monomer used, and the nature and quantity of the catalyst or promoter, if any present in the monomer.

Figure 1:
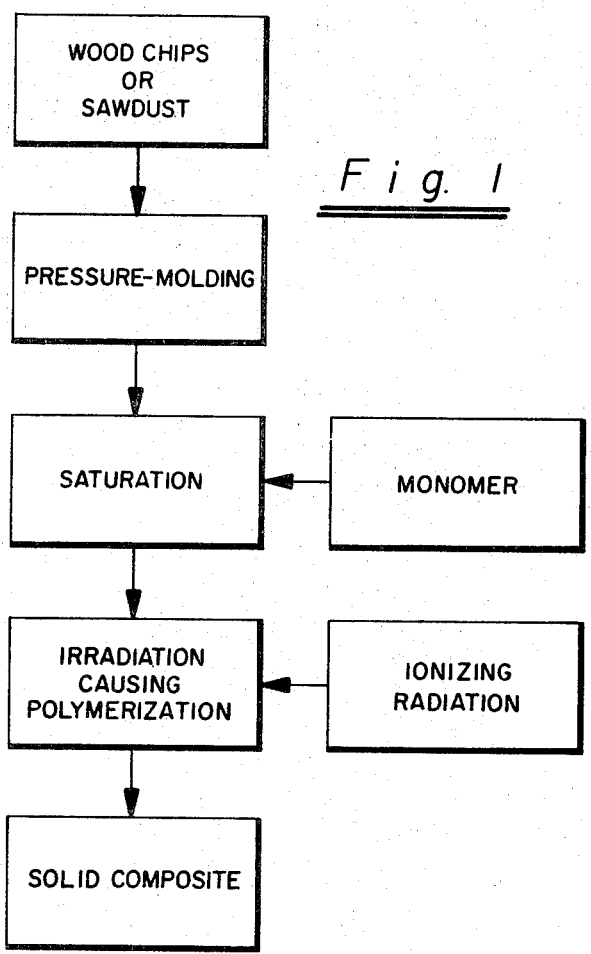
FIG. 1 is a schematic representation of the steps according to one embodiment.

The foregoing steps are illustrated in FIG. 1 for the embodiment in which the particles of wood and/or sawdust are first compressed within a mold and thereafter impregnated by saturating the compressed mass with a liquid which consists of or contains the monomer. When pressure-molding follows impregnation with the monomer, these operations are reversed in sequence.

The objects resulting from this process are cohesive and have smooth, durable finishes. They have excellent structural properties, including dimensional stability and strength.

The product can be worked by conventional tools, e.g. sawed, drilled, routed and milled.

It is sometimes advantageous to maintain at least some pressure on the mass of compacted and saturated monomer during irradiation, thereby to maintain the desired shape of the mass and to improve the surface finish of the cured article. This is especially true when the mold surface has intricate patterns. However, in many applications the compacted and impregnated mass can be irradiated while confined in a mold at atmospheric or slightly superatmospheric pressure. Thus, the mold usually has a cover to retain the upper surface of the object, but in some applications irradiation is effected in an open mold.

Pressures can be produced by tamping or by applying such a force to the mold as to produce a pressure, typically between 20 and 100 p.s.i., to the mass of particles. Pressures in the upper part of this range are preferred to improve the finish, and should be used when the mold is sculptured or textured. However, pressures above 100 p.s.i., while usable, are not believed to improve the surface finish significantly.

Any material capable of withstanding the compaction pressure can be used for the molds; for example, plastic, steel-reinforced plastic, glass and metal molds are all suitable. Preferably, the mold has sufficient rigidity to be essentially free of distortion, including temperature-distortion. To facilitate stripping the finished article from the mold it is desirable to form the mold of or to provide on their molding surfaces a plastic material, such as that known as Teflon, not only because of the relatively non-reactive nature of this material, but also because the low atomic numbers (Z-numbers) of such plastic material cause reduced attenuation of the incident gamma rays when these effect the ionizing radiation. Alternatively, a sheet or film of such a plastic material can be applied to line the mold.

It is desirable to effect the irradiation in the absence of any or of large amounts of oxygen or other oxidizing material because oxygen and the like retard the polymerization. This may be achieved, for example, by enclosing the mass of impregnated particles in a plastic bag, and compacting the mass through the bag, or by working in an inert atmosphere. For example, the radiation chamber may be purged with nitrogen after introducing the mold containing the molded mixture.

The monomers used are liquid, this term being used to include substances that are liquified by means of a solvent.

Examples of monomers suitable for use in this invention and having radiation-activatable reactive groups are given in the U.S. patent to Kenaga, No. 3,077,417, and the description of the several types of monomers therein given by structural chemical formulae are incorporated herein by reference. Among the monomers therein described, it is preferred to use esters of acrylates, methacrylates and ethacrylates represented by the structural chemical formula

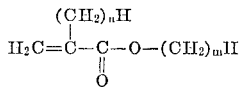

wherein $n$ is an integer from 0 to 2 and $m$ is an integer from 1 to 4, both inclusive. Thus, the preferred monomers are methyl methacrylate, ethyl acrylate, propyl acrylate and butyl methacrylate and others and their mixtures.

The monomer may be used in solution with a material such as $CCl_4$. $CCl_4$ catalyzes or promotes the polymerization and the presence of such a material is preferred. The solution is advantageously highly concentrated, e.g., contains over about 70 percent monomer. By way of example, the solution may consist of 5–15 percent by weight of $CCl_4$ and a monomer such as methyl methacrylate. The radiation dosage required is reduced when at least 5 percent of $CCl_4$ is present.

The weight ratio of the monomer to the lignocellulose particles is between about 3.8:1 and 1.8:1, and is preferably below about 2.5:1. The particles are in touching relation.

Impregnation of the particles can be effected at any desired temperature and pressure. For example, the monomer or its solution can be simply mixed with the particles by pouring feeding the materials into a mixer which has an agitator blade, mixing being continued for a short time such as two to five minutes at ordinary temperature and pressure, and the mixture is thereafter subjected to pressure in a mold. Alternatively, the pressure can be applied before adding the monomer, by pouring it or its solution over a bed or mass of particles that have been packed in a mold in the amount necessary to saturate the mass of particles.

Any form of high-intensity ionizing radiation may be used, and may consist of or include in significant amounts electromagnetic radiations, also called gamma rays (of which X-rays are an example), preferably having wave lengths between 0.01 and 14 A. The radiations may, alternatively or additionally, consist of or include significant amounts of electrons, sometimes called electron rays, preferably having energies between about $10^{-3}$ and 15 mev., and beta rays having energies between 0.5 and 15 mev.

The radiation source may be a radionuclide or an electronic device, such as an X-ray tube, a linear accelerator, or a Van de Graff or a dynamitron-type machine. Radionuclides such as cobalt 60, iridium 192, and cesium 137, may be formed as a byproduct of nuclear reactor operations or the elemental metal such as cobalt 59, may be subjected to neutron bombardment to form radioactive cobalt 60. The resulting radioactive cobalt emits gamma rays with energies of 1.17 and 1.33 mev. and has a half-life of 5.3 years. Beta rays, consisting of electrons of nuclear origin, may be employed by using as a source a material such as strontium 90, possessing sufficient energy to cause ionization to an economically significant depth into the sawdust or other lignocellulose particles.

The irradiation is such that the total adsorbed radiation dose is between about 0.6 and 4.0 megarad of penetrating ionizing radiation. The unit of radiation "megarad" is used herein to denote that quantity of radiation which imparts the absorbed dose of one million rad to each gram of irradiated product. One rad indicates that 100 ergs of energy have been imparted to each gram of irradiated material, so that one megarad represents the absorption of $10^8$ ergs per gram. The radiation dose is, in any specific instance, such as to cause at least 65 percent and, preferably, 100 percent polymerization.

It should be noted that although this is a "cold" polymerization, in that no heat is added to the reaction, some rise in temperature occurs, principally while the polymerization passes from 30 percent to 100 percent, because the reaction is exothermic.

Typically, the radiation is continued for a period of about 20 minutes to 4 hours, in accordance with the radiation intensity, and a radiation time of two hours has been found to be possible when working with an experimental 20,000 curie cobalt 60 source. This time can be reduced substantially with more intense sources, such as plants of commercial size containing radioisotopes, or utilizing the principle of electron acceleration.

Among the products that can be produced by this process are bottles, jars, boxes, handles, floor tiles, and ornamental objects. Any of these can be made using particles of selected or graded sizes and colors, and one can also use mixtures of particles having different hues and/or sizes. For example, it is possible to form an article containing only sawdust passing a ⅛-inch or a ¼-inch screen or mixtures of sawdust and larger chips. Ornamental patterns can be produced by using mixtures of light and dark-colored particles, e.g. chips of one color and sawdust of another. Floor tiles case with fir bark and fir sawdust have an embedded chip effect; yet the polymerized binder extends between the particles and to the surface to give the tile excellent wear-resisting properties. Further, various pigments can be added, either to the particles, e.g., a different color to each of several batches, or to the monomer.

Another specific application of the process is in applying coatings to pre-existing objects. For example, the lignocellulose plastic composite can be formed about a bottle, such as one made of glass or plastic material, or it can surround a metallic bar having fittings for attachment to another object. Further, metallic or other non-cellulosic material can be included in the mass in minor amounts to further improve the wear resistance properties, alter the appearance, or give the product abrasive characteristics.

Figure 2:
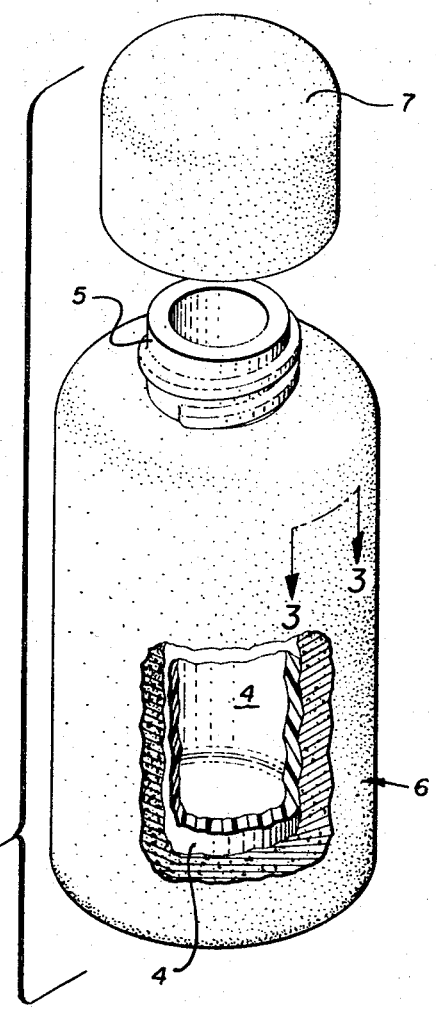
FIG. 2 is a pictorial view of a bottle having a coating produced according to the invention, parts appearing in section.

The application of the composite to a bottle is illustrated in FIG. 2, wherein the bottle proper 4 is made of any desired material, such as plastic, e.g., polypropylene and may have a threaded neck 5 for receiving a plastic screw cap. The bottle 4 is placed into a mold and a coating 6 of sawdust and wood chips is packed into a mold under pressure to compact the coating. The liquid monomer or its solution is then poured into the mold to saturate the coating mixture and the mold is subjected to irradiation to polymerize the monomer. The same treatment can be applied to the cap, to which a coating 7 is applied in the manner described for the coating 6.

When the core object, such as the bottle 4, is made of certain plastics, wood, etc., the coating is bonded thereto. When the object is made of certain other plastic materials, glass or metal, bonding is weak or lacking, and then the coating adheres to the object by virtue of their relative shapes.

The degree of polymerization can be controlled, e.g. to effect polymerization between 10 and 100 percent, to vary the properties of the coating. This is controlled by limiting the total radiation dosage. Incomplete polymerization is, for example, useful to form a composite product which has sawdust or wood chip particles somewhat exposed to decomposition while yet achieving uniform distribution of the monomer by soaking the wood particles with the liquid monomer. It is also possible to apply the liquid monomer in a smaller amount than necessary to saturate the particles, as by spraying the surface of a layer after the upper part of a mold is removed and effecting complete or nearly complete polymerization. The latter technique is, of course, difficult and often impracticable when an intricate shape of a uniform surface is desired. Regardless of the technique employed, leaving a part of the sawdust or wood chips unbonded is useful, for example, when the object is a container for nursery trees or shrubs. It is not necessary then to remove the plant from such a container; upon planting the container in the ground, the latter is subjected to moisture and soil bacterial action, resulting in sufficient decay to permit root zone growth almost immediately after planting.

The compressibility of the composite can be controlled by a selection of the monomer. Thus, when using the preferred class of monomers defined above by the structural formula, the polymers in general are harder when $n$ and $m$ have their lowest values, such as zero for $n$ and 1 for $m$, and are less rigid when they have higher values.

Figure 3:
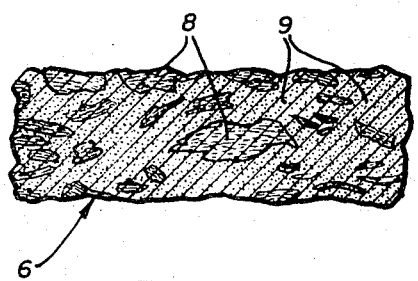
FIG. 3 is a fragmentary section of the composite product, on an enlarged scale, taken on the line 3—3 of FIG. 2.

FIG. 3 shows the appearance of the interior of a composite formed from dark chips 8 and light-colored sawdust 9 bound by polymerized material. The surface has a similar appearance. Such a composite may, for example, have the following characteristics:

Surface hardness, as determined with Shore–D hardness tester, using A.S.T.N. Code D–1484, was measured at 68D through 77D.

Compressive strength: 3,000 pounds per square inch.

Insoluble in 10 N nitric acid, concentrated sodium hydroxide and boiling water; moderately soluble in toluene.

EXAMPLE I

Twenty-six grams of dry white fir sawdust, having particle sizes to pass a ¼-in. mesh screen, were hand-compacted into a polypropylene tray measuring 2.75 by 3.75 inches. The sawdust was pressed down firmly and 55 cc. of a monomer solution was poured over the sawdust until it was saturated. The solution consisted of 81 percent methyl methacrylate and 9 percent carbon tetrachloride. The mold was then sealed within a plastic bag to exclude as much atmospheric oxygen as possible and placed into an aluminum irradiation chamber. The latter contained the mold within a ring of 10 cobalt 60 rods having a total of 11,000 curies of that radionuclide. The mold was left in that postiion for two hours, without application of pressure, resulting in a total absorbed dose of approximately two megarads. After removal from the chamber, the plastic mold was stripped from the casting and the latter was tested. It had the propreties stated above.

EXAMPLE II

Dry white fir sawdust and the same solution of monomer described in Example I were mixed in the same proportions within the empty tubular cartridge of caulking gun. The cartridge was attached to the gun and the mixture was forced out of the gun nozzle to simulate injection-molding technique. The slurry was injected into a polypropylene bottle mold having intricate patterns at a pressure of approximately 25 p.s.i., causing the slurry to penetrate into recesses of and to conform to a mold surface. The bottle mold was then sealed, placed into a plastic bag, and positioned within a radiation chamber as described in Example I. The product was a bottle having the properties noted above.

I claim:

1. Process of forming a solid, cohesive object characterized in having stability of shape from subdivided lignocellulose particles which comprises the steps of:

(a) forming in a mold a compact mixture of said particles and a liquid monomer which has a radiation-activatable reaction group and polymerizes when subjected to ionizing radiation by a forming operation which includes applying pressure to the particles within the mold to compact them into touching relation, and (b) subjecting said mixture to ionizing radiation and thereby substantially polymerizing said monomer.

2. Process according to claim 1 wherein said monomer has the structural chemical formula

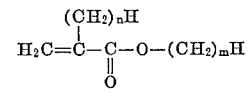

wherein $n$ is an integer from 0 to 2 and $m$ is an integer from 1 to 4, both inclusive.

3. Process according to claim 1 wherein said monomer is methyl acrylate.

4. Process according to claim 1 wherein said monomer is methyl methacrylate.

5. Process according to claim 1 wherein said monomer is propyl acrylate.

6. Process according to claim 1 wherein said liquid monomer is applied to the lignocellulose particles by saturating a mass of said particles after compaction under pressure.

7. Process according to claim 1 whereby said solid object is formed as a coating to a pre-existing solid object by placing said pre-existing object into the mold before compacting the particles.

References Cited

UNITED STATES PATENTS

| | | | |
|---|---|---|---|
| 2,768,754 | 10/1956 | Briggs | 264—122 |
| 2,780,612 | 2/1957 | Tegrotenhuis | 260—17.4 |
| 3,058,165 | 10/1962 | Purvis | 264—22 |
| 3,077,417 | 2/1963 | Kenaga | 204—159.12 |
| 3,183,208 | 5/1965 | Jurgeleit | 260—41 |

OTHER REFERENCES

Gabriel: Sawdust-Binder Compositions, Modern Plastics, April 1948, pp. 145, 146, 147, 200, 216.

MURRAY TILLMAN, Primary Examiner

R. B. TURER, Assistant Examiner

U.S. Cl. X.R.

117—93.31; 260—17.4; 264—128, 236, 319